United States Patent [19]

McDougal

[11] 4,251,065

[45] Feb. 17, 1981

[54] QUICK SET HYDRAULIC VISE

[76] Inventor: Thomas F. McDougal, TR. 5, Box 165, Fairmont, W. Va. 26554

[21] Appl. No.: 115,046

[22] Filed: Jan. 24, 1980

[51] Int. Cl.³ .......... B23Q 3/08

[52] U.S. Cl. .......... 269/25; 269/35; 269/204

[58] Field of Search .......... 269/203, 204, 196, 25, 269/35, 20

[56] References Cited

U.S. PATENT DOCUMENTS 2,704,002 3/1955 Beausoleil .......... 269/35 X

FOREIGN PATENT DOCUMENTS 2347735 10/1975 Fed. Rep. of Germany .......... 269/203

*Primary Examiner*—Robert C. Watson

*Attorney, Agent, or Firm*—Mason, Fenwick & Lawrence

[57] ABSTRACT

A quick set hydraulic workholding vise including a fore-and-aft longitudinal elongated base having a front stationary jaw and a rear jaw movable toward and away from the stationary jaw. The movable jaw is interfitted on a slide plate for sliding movement of the movable jaw to coarse adjustment spacing slightly larger than the corresponding dimension of the work portion to be received between the jaws and the slide plate extends centrally along substantially the length of the base and is movable through a limited predetermined range relative to the base between a forward gripping position and a rearward release position for the movable jaw. Compound wedge means are provided for releasibly gripping opposite side portions of the slide plate and clamping the movable jaw at the coarse adjustment position, and hydraulic power means rapidly move the slide plate and the movable jaw to the forward gripping position. The slide plate and movable jaw are spring returned to said rearward release position.

18 Claims, 8 Drawing Figures

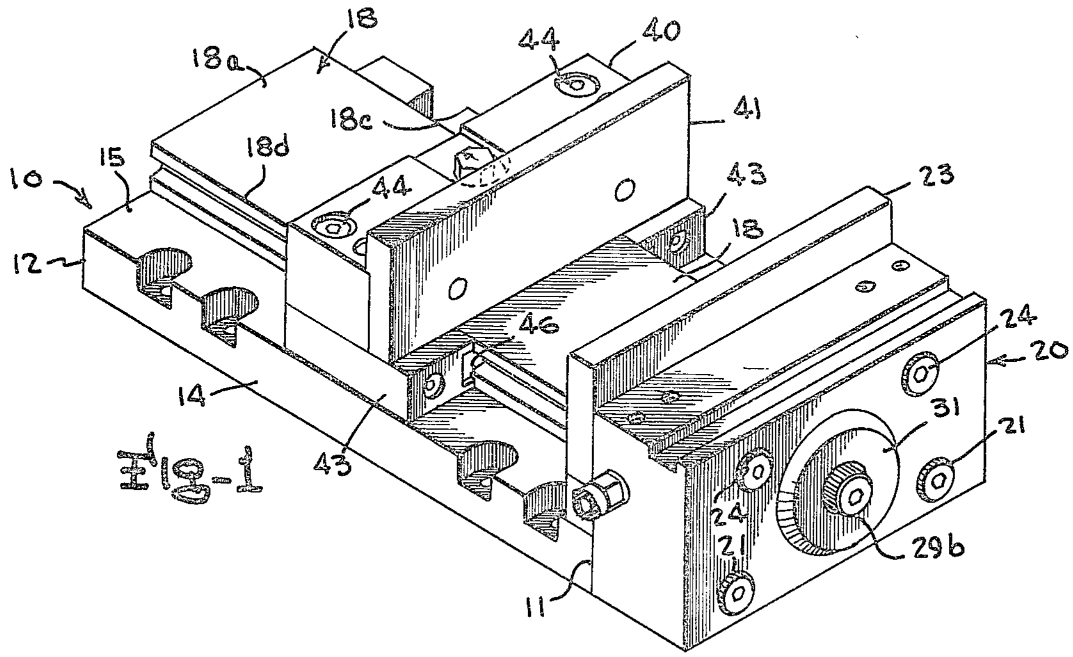
Fig-1
Fig-5
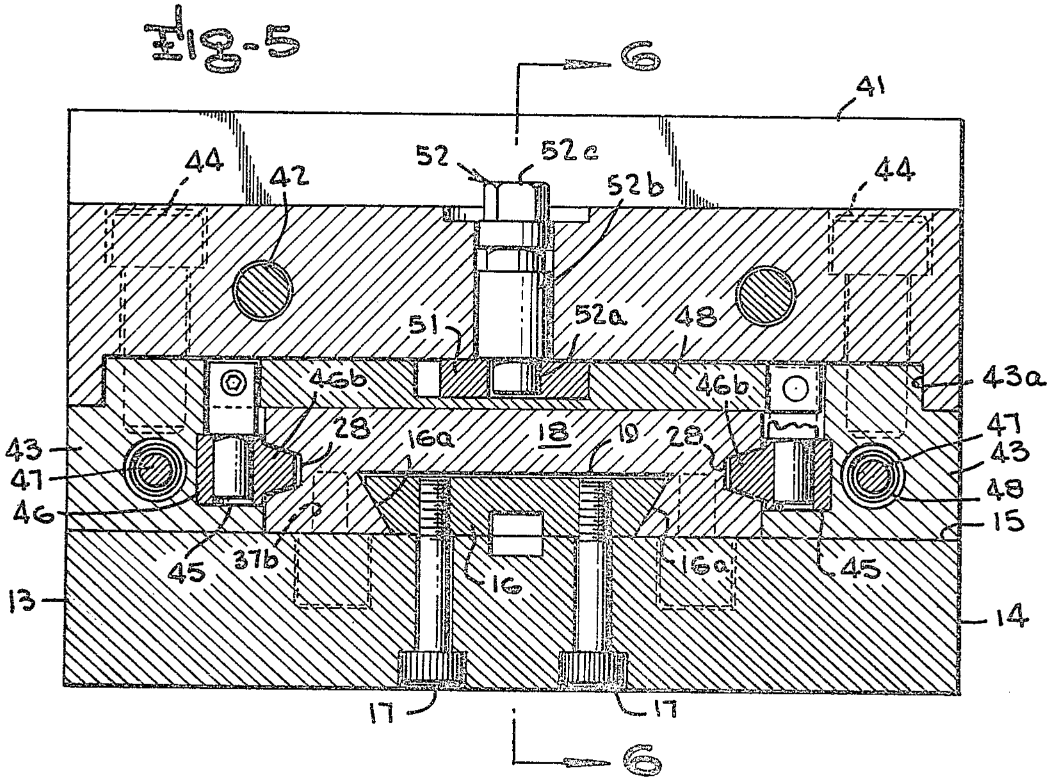

31
29
20
23
36
18b
29a
18
38
38
37
37
43
43
44
47
41
43b
44
44
51
52
48
40
44
46c
44
14
18c
18d
13
12
15

31
29
21
20
33
35
34
11
23
24
28
18
43
41
38
37
5
40
52
5
18a
18
15
12
14

QUICK SET HYDRAULIC VISE

BACKGROUND AND OBJECTS OF THE INVENTION

The present invention relates to a quick setting hydraulic vise or workholding device having a stationary jaw disposed toward the operator from the work receiving space and a movable jaw disposed more remotely from the operator which may be easily set in any position within its range, having compound wedge means for securing the back jaw in approximate load gripping position and hydraulic means for quickly setting the movable jaw in tightly gripping relation with the work.

Heretofore, many types of workholding vises have been produced, some of which are manually screw operated to move the movable jaw toward and away from the fixed jaw, or wherein motor means are provided for power activation of the clamping jaw structure. Some of such devices have involved manual positioning of the movable jaw member in proximate relation to the work and then activation of a hydraulic system to achieve final quick action clamping.

However, the present invention provides a quick set hydraulic vise construction wherein the stationary jaw is positioned towards the operator from the work receiving zone and is located toward the operator from the stationary jaw, particularly adapting the system for use on a numerically controlled machine such that the datum line enables all programming to be in the first quadrant. The movable jaw is easily and quickly set at any position within its range, and is designed to allow maximum use of the working space of the machine while holding its front-to-back dimension as small as practicable. It enables manual setting of the movable jaw to approximate work gripping position and provides a compound wedge friction device for securing the rear movable jaw in a manner which grips the work tighter as load is applied and prevents upward movement as the jaw is tightened.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a front perspective view of a quick set hydraulic vise constructed in accordance with the present invention;

FIG. 5 is a vertical transverse section view thereof, taken along the line 5—5 of FIG. 4;

DETAILED DESCRIPTION OF A PREFERRED EMBODIMENT

Figure 2:
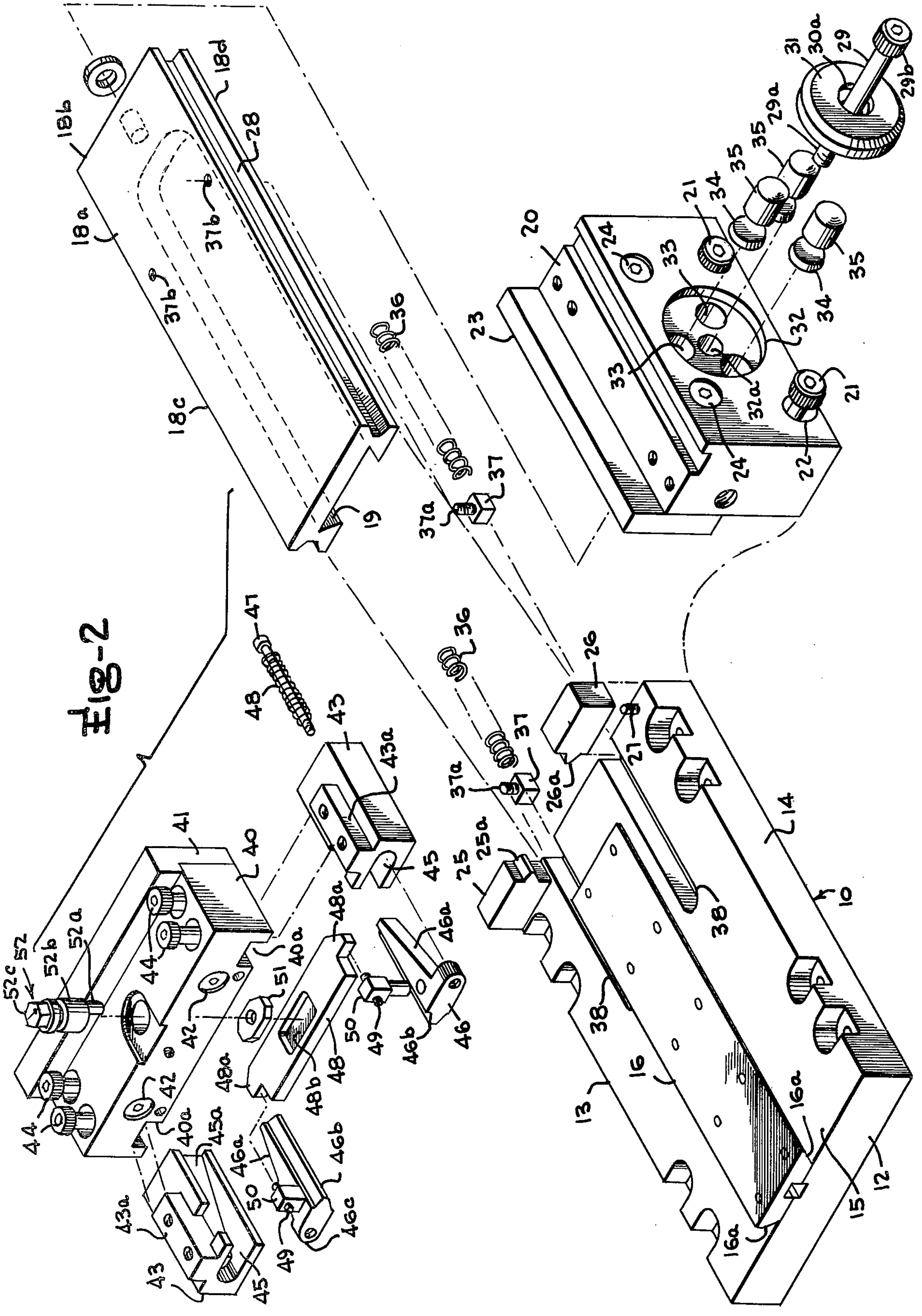
FIG. 2 is an exploded perspective view thereof.
Figure 3:
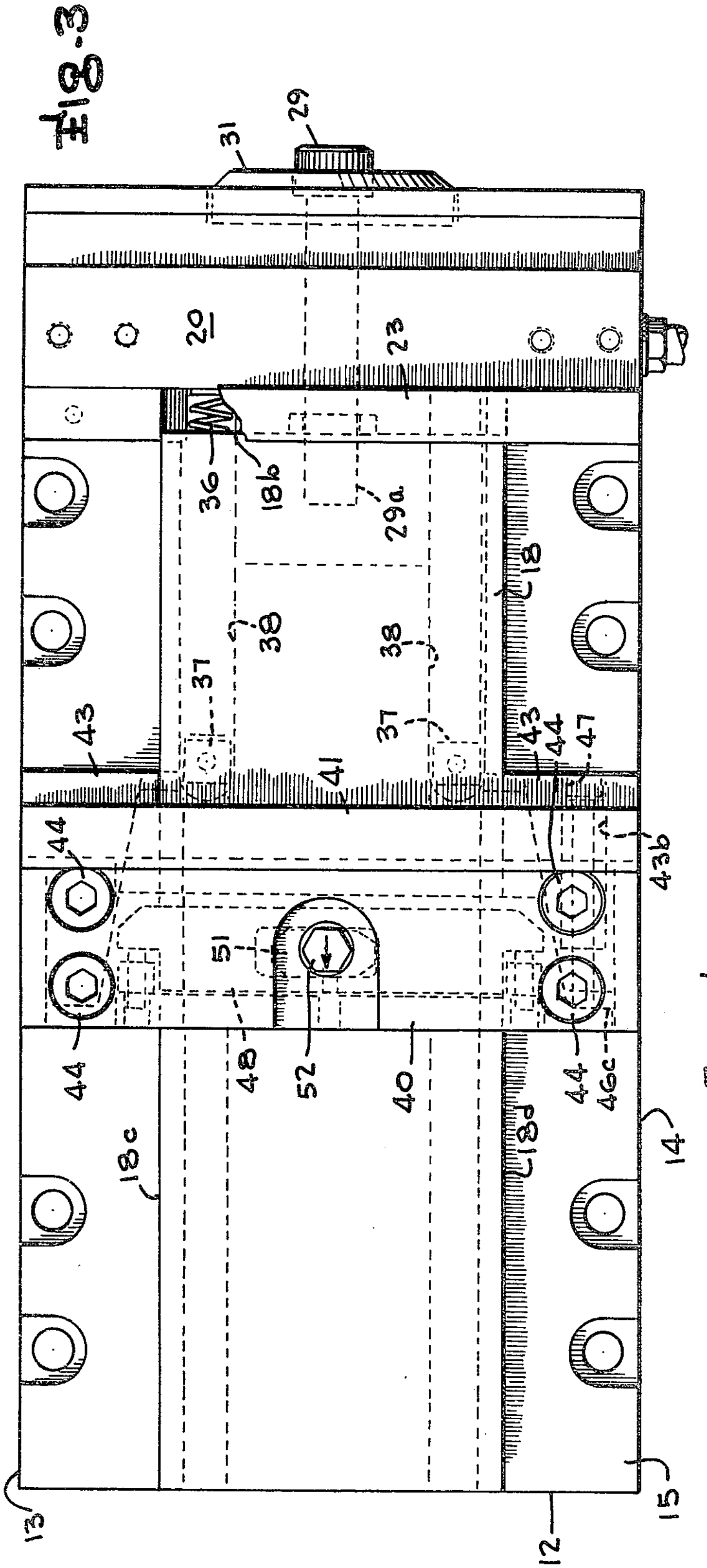
FIG. 3 is a top plan view of the quick set hydraulic vise.
Figure 4:
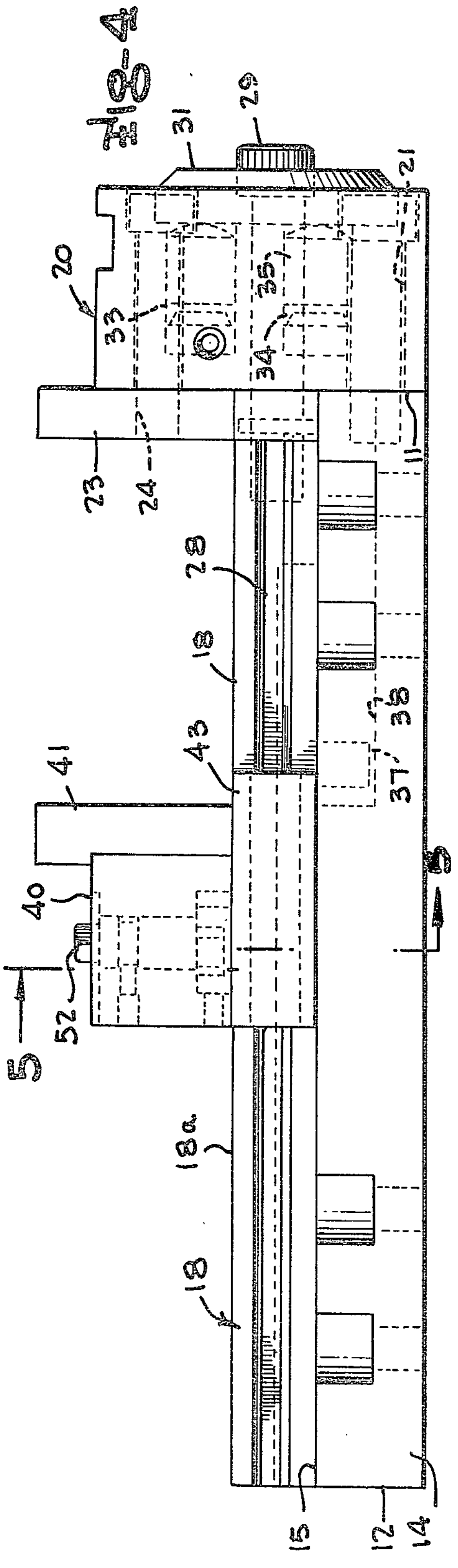
FIG. 4 is a side elevation view thereof, viewed from below FIG. 3.

Referring to the drawings, wherein like reference characters indicate corresponding parts throughout the several figures, the quick set hydraulic vise of the present invention comprises an elongated base member of generally vertical profile in top plan view, indicated by the reference character 10, having front and rear end walls 11,12, side walls 13 and 14, a flat bottom wall, and a top wall 15 having a wide, elongated dovetail block 16 rigidly fixed to the base member 10, as by fastening bolts 17. The dovetail, as will be apparent from FIGS. 2 and 5, is of usual isosceles trapezoidal cross-sectional configuration with the inclined sides **16*a* thereof arranged in downwardly converging relation. An elongated slide block 18 having a dovetail recess 19 of a cross-section to closely interfit with and slidably receive the dovetail 16** slides forwardly and rearwardly on the dovetail.

A stationary jaw member 20 is provided at the front end of the base member 10 and is rigidly fixed thereto by threaded bolts 21 recessed in drill holes 22 therefor in the stationary jaw 20, having enlarged heads with hexagonal sockets for Allen wrenches or similar driving tools to be received in enlarged front portions of the holes 22 and having threaded inner ends threaded into tapped openings in the base member 10. A rectangular jaw face or jaw blank 23 is fixed to the stationary jaw 20 by similar mounting bolts 24 extending through and recessed in suitable holes in the stationary jaw member 20 into tapped openings formed in and opening through the front face of the jaw face or blank member 23. The lower edge of the front or stationary jaw face or blank 23 is located immediately above the top surface **18*a* of the slide 18 adjacent the front end 18*b* of the slide, and a pair of wiper blocks 25,26 are fixed by mounting bolts, one of which is indicated at 27, at the two front corners of the base member 10 so that they butt against the rear face of the stationary jaw member 20 and have truncated V-shaped tongues 25*a*,26*a* which interfit into and conform closely to the size and configuration of the truncated V-grooves or channels 28 in the opposite sides 18*c*,18*d* of the slide member 18**.

Figure 6:
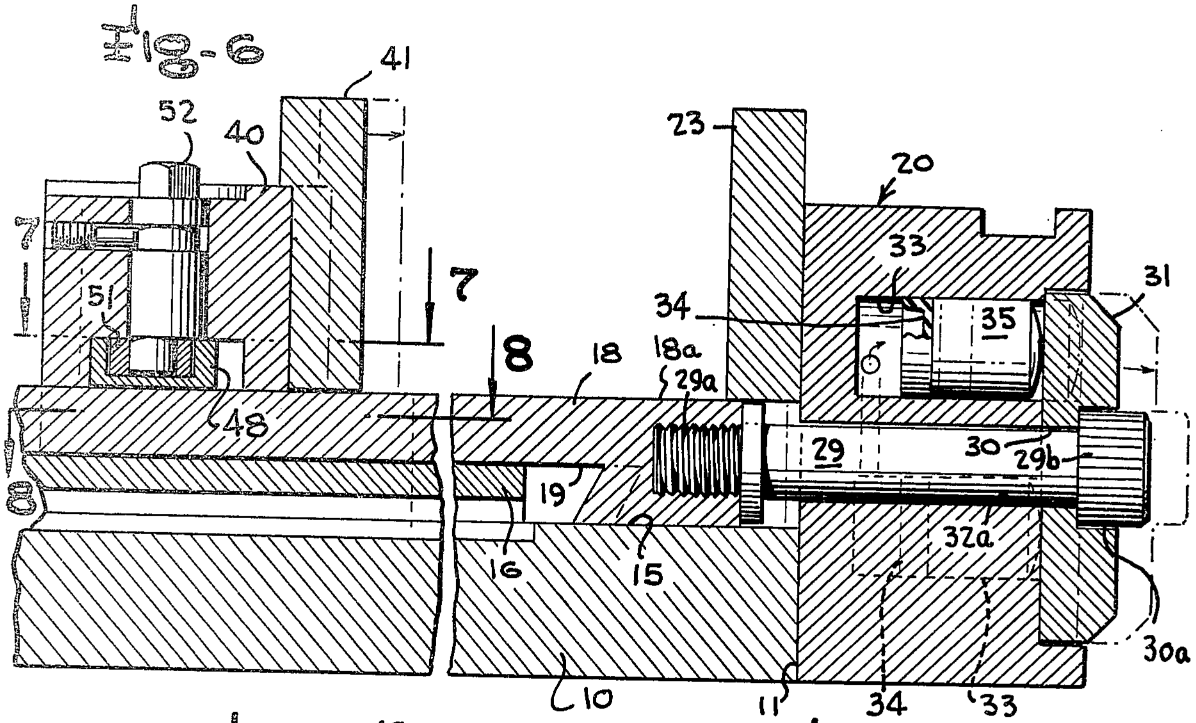
FIG. 6 is a fragmentary vertical longitudinal section view through the front stationary jaw and the rear movable jaw and adjacent portions of the base and slide members.

The slide member 18 is capable of executing a limited small advancing and retracting stroke toward and away from, respectively, the stationary jaw 20 while being rigidly restrained against vertical or horizontal tilting movement by the dovetail block 16 of the base closely interfitting in the dovetail recess 19 of the slide 18. Advancing and retracting sliding movement is imparted to the slide block 18 by the slide control bolt 29 having its rearmost threaded end **29*a* threaded into a tapped opening in the forward end portion of the slide 18 along the center line thereof and having an enlarged head 29*b* seated in a complimentary enlarged bore portion 30*a* of the through bore 30 in the annular pressure plate 31 which is partially nested in a forwardly facing circular recess 32 opening through the front face of the stationary jaw 20 as shown. Three piston cavities 33 communicate with the circular recess 32 and extend rearwardly therefrom, which are equally spaced circumferentially about the center bore portion 32*a* extending rearwardly from the circular recess 32 through the remainder of the stationary jaw 20 through which the shank of the slide control bolt 29 extends. These piston cavities 33 each house a piston cup 34 and a hydraulically operated piston 35 whose forward edge bears against the rear wall of the pressure plate 31 to drive the pressure plate 31, and the slide control bolt 29 and slide 18 interconnected therewith, forwardly to tightly grip the work, as later described, when hydraulic fluid is valved by conventional hydraulic system controls to the rear portions of the piston cavities 33, advancing the pressure plate and slide from the solid line position to the broken line position illustrated in FIG. 6. The slide 18 is continuously resiliently biased rearwardly by coil springs 36 bearing at their front ends against the rear face of the stationary jaw member 20 and at their rear ends against generally cube-shaped spring blocks 37 which track in the pair of parallel grooves 38 paralleling the longitudinal or front-to-rear center axis of the base 10 and extending from the front edge thereof approximately half the length of the bed 10 in the illustrated embodiment, the spring blocks 37 being secured to the slide 18 by bolts 37*a* extending upwardly into tapped openings 37*b* in the slide 18**.

The movable jaw assembly is supported for selective sliding movement along the slide 18 and comprises a generally rectangular movable jaw member 40 which transversely spans the width of the base 10 and carries a jaw face or blank member 41 on the forwardly facing surface of the jaw member 40, secured thereto by mounting bolts 42 similar to the mounting bolts 21 associated with the stationary jaw assembly. An eccentric operated wedge mechanism is associated with the movable jaw assembly, comprising a pair of wedge blocks 43 having upwardly extending rectangular ribs **43*a* at the top thereof to be received in correspondingly shaped recesses 40*a* in the lower surface of the movable jaw member 40 near the opposite sides thereof, and rigidly fastened to the movable jaw member 40 by mounting bolts 44. The wedge blocks 43 have inwardly facing wedge receiving recesses 45 therein provided with forwardly converging inclined base walls 45*a* to receive wedge members 46 having confronting inclined wedge surfaces 46*a* to slidably bear against and be cammed by the inclined base surfaces 45*a* of the wedge receiving recesses 45, and having inwardly facing truncated V-shaped tongues 46*b* whose cross-section closely corresponds to that of the outwardly facing grooves 28 in the sides of the slide 18 to slidably interfit in the slide member side grooves 28. The wedge members 46 are slidably retained in the grooves 45 of the wedge blocks 43 and continuously biased forwardly by bolts 47 and surrounding coil springs 48 located in a spring receiving recess 43*b* of each wedge block 43 and extending through a smaller bore communicating with recess 43*b* and into a tapped opening in the shoulder formation 46*c* of each wedge member 46**.

Figure 7:
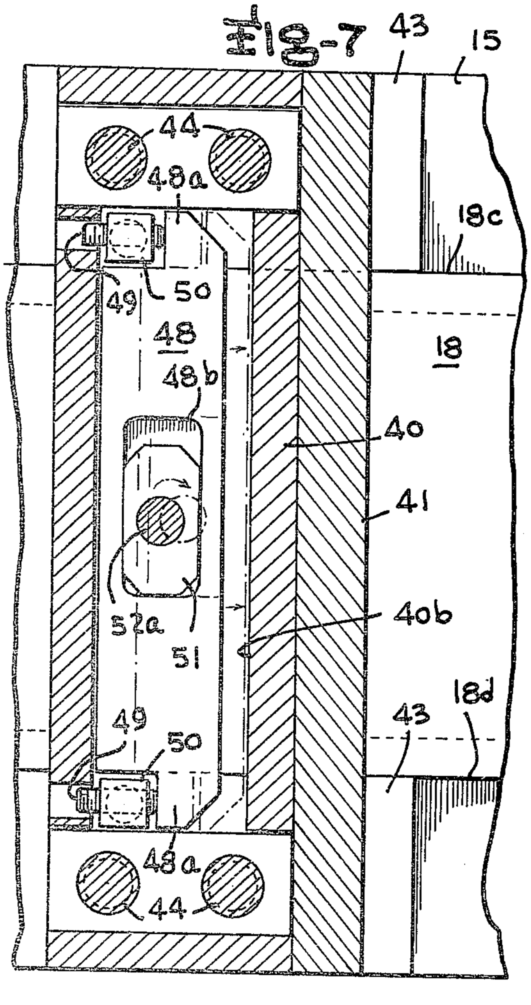
FIG. 7 is a fragmentary horizontal section view through the lower portion of the movable jaw and jaw face, taken along the line 7—7 of FIG. 6.

The positions of the wedge members 46 in the wedge blocks 43 is controlled by a release bar 48 which is slidable between a rearward position shown in solid lines in FIG. 7 and a forwardly displaced position shown in broken lines in FIG. 7 within a recess **40*b* therefor in the lower surface of the movable jaw member 40 and has a pair of abutment shoulders 48*a* at its opposite ends abutted by set screws 49 in abutment blocks 50 which are assembled with the wedge members 46, for example by cylindrical stubs tightly fitted in accommodating sockets in the wedge members 46. The release bar 48 has a shaped central recess 48*b* which houses an elongated 8-sided bearing member 51 having a central opening in which is rotatably fitted the eccentric cylindrical pin formation 52*a* of the eccentric member 52. The cylindrical eccentric pin formation 52*a* projects downwardly into the central hole in the bearing 51, while the larger diameter cylindrical body portion 52*b* of the eccentric is rotatably journaled in a cylindrical hole 40*d* arranged on a vertical axis at the center of the movable jaw member 40 so that, upon rotation of the eccentric member 52 about the center axis of the cylindrical body portion 52*b*, the eccentric pin 52*a* moves the bearing 51 in a direction to cause the release bar 48 to move from the solid line to the broken line forwardly displaced position or vice versa. The top portion of the eccentric 52 is formed, in the illustrated embodiment, with a hex-shaped head 52*c* which projects above the top surface of the movable jaw member 40** to facilitate convenient operation of the eccentric by a socket wrench or similar tool.

Figure 8:
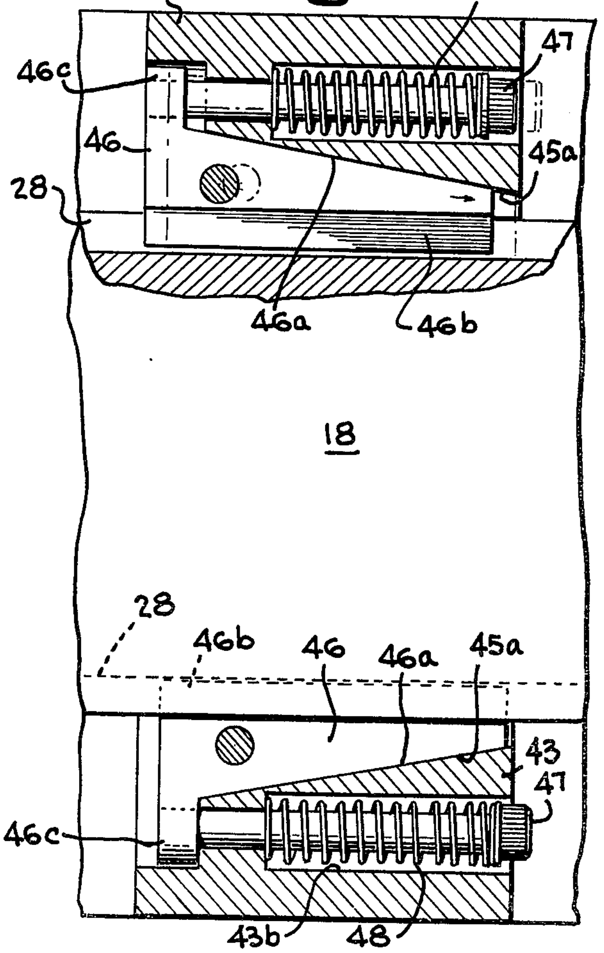
FIG. 8 is a fragmentary horizontal section view through part of the slide and portions of the wedge block and wedge structure, taken along the line 8—8 of FIG. 6.

The operation of the quick set hydraulic vise, assuming the pressure plate 31 and the interconnected slide control bolt 29 and slide block 18 to be in the rearmost or solid line position to which it is normally biased by the springs 36 acting on the spring block 37 secured to the slide 18, the hex-shaped upper end of the eccentric 52 is adjusted by a tool such as a socket wrench to dispose the eccentric pin **52*a* at its rearmost position as shown in solid lines in FIG. 7, whereby the bearing blocks 50 and wedge members 46 secured thereto are forced to their rearmost limit positions relative to the wedge blocks 43 so that the truncated V-shaped tongues 46*b* of the wedge members are retracted from clamping relation in the grooves 28 of the slide 18. Thus the movable jaw assembly including the movable jaw member 40 and its associated jaw face or blank 41 are freely adjustable manually along the slide 18 to bring the jaw face or blank 41 close to or lightly against the rear face of the work when the work to be held is abutting the rearward facing surface of the front stationary jaw face 23. The eccentric 52 is then rotated in a direction to move the eccentric pin 52*a* forwardly until the arrow on the top of the eccentric 52 points towards the front of the vise, which retracts the shoulders 48*a* of the release bar forwardly to the broken line position illustrated in FIG. 7 and permits the wedges 46 to move forwardly under the force of the springs 48, which through the action of the confronting inclined surfaces 45*a* and 46*a* forces the wedge members 46 inwardly to interfit the tongues 46*b* into tightly fitting and gripping relation in the grooves 48 of the slide 18 to the position illustrated in the lower part of FIG. 8, or the broken line position in the upper part of FIG. 8. The hydraulic control valve, not shown, can then be activated in the usual, well-known manner to supply pressurized hydraulic fluid to the rear portion of the piston cavities 33 rearwardly of the piston cups 34, forcing the piston cups 34 and pistons 35 forwardly and driving forwardly with them the pressure plate 31, slide control bolt 29 and slide 18 to move the slide 18 and the movable rear jaw assembly now wedged tight against the slide forwardly in tightly gripping relation to the work to clamp the work between the jaw faces 23 and 41. The work is held tightly clamped between the jaw faces so long as the hydraulic pressure continues to be applied to the pistons 35 and piston cups 34. However, upon operation of the control valve to remove the pressure applied to the rear portion of the piston cavities or vent those rear portions to the reservoir or lower pressure leg of the hydraulic fluid system, the force of the springs 36 against the spring blocks 37 fixed to the slide 18** immediately returns the slide rearwardly to its solid line position shown in FIG. 6, carrying with it the movable jaw assembly to effect quick release of the work from clamped condition.

I claim:

1. A quick set hydraulic workholding vise comprising an elongated stationary base plate member having a fore-and-aft longitudinal axis, a front stationary jaw fixed to said base plate member at a front end thereof and a rear jaw movable toward and away from said stationary jaw along said longitudinal axis, an elongated slide plate of narrower width than said base plate member overlying and extending centrally along substantially the length of the latter, means supporting the slide plate for a limited predetermined range of longitudinal movement between a forward gripping position and a rearward release position for the movable jaw, means interfitting said movable jaw on the slide plate for sliding movement of the movable jaw to coarse adjustment position along the length of the slide plate disposing the jaws at a work-release spacing slightly larger than the corresponding dimension of the work portion to be received between the jaws, compound wedge means for releasibly gripping opposite side portions of the slide plate and clamping the movable jaw thereto at the coarse adjustment position, hydraulic power means including a movable pressure plate associated with the stationary jaw connected to said slide plate for rapidly moving the slide plate and the movable jaw clamped at its coarse adjustment position thereon to said forward gripping position responsive to application of fluid pressure force to the power means, and means for returning said slide plate and movable jaw thereon to said rearward release position upon removal of the fluid pressure force from the power means.

2. A quick set hydraulic workholding vise as defined in claim 1, wherein said hydraulic power means includes piston members supported for movement in said stationary jaw along axes paralleling said longitudinal axis and bearing against said pressure plate, and means for applying fluid pressure force to said piston members for moving the pressure plate forwardly relative to the stationary jaw to force the slide plate and movable jaw to said forward gripping position.

3. A quick set hydraulic workholding vise as defined in claim 2, wherein said hydraulic power means includes piston members supported for movement in said stationary jaw along axes paralleling said longitudinal axis and bearing against said pressure plate, and means for applying fluid pressure force to said piston members for moving the pressure plate forwardly relative to the stationary jaw to force the slide plate and movable jaw to said forward gripping position, and said means for returning said slide plate comprising spring members bearing against shoulder formations fixed to the slide plate biasing the slide plate rearwardly to return the same to said rearward release position when fluid pressure force is removed from the piston members.

4. A quick set hydraulic workholding vise as defined in claim 3, wherein a slide control bolt carried by said pressure plate extends rearwardly from the pressure plate through said stationary jaw and connects rearwardly to said slide plate, and said stationary jaw having a bore therethrough slideably supporting said slide control bolt for axial movement parallel to said longitudinal axis.

5. A quick set hydraulic workholding vise as defined in claim 2, wherein a slide control bolt carried by said pressure plate extends rearwardly from the pressure plate through said stationary jaw and connects rearwardly to said slide plate, and said stationary jaw having a bore therethrough slideably supporting said slide control bolt for axial movement parallel to said longitudinal axis.

6. A quick set hydraulic workholding vise as defined in claim 3, wherein a slide control bolt carried by said pressure plate extends rearwardly from the pressure plate through said stationary jaw and connects rearwardly to said slide plate, and said stationary jaw having a bore therethrough slideably supporting said slide control bolt for axial movement parallel to said longitudinal axis.

7. A quick set hydraulic workholding vise as defined in claim 5, wherein said piston members are located at three substantially equally circumferentially spaced positions located in a path outwardly surrounding said slide control bolt to bear forwardly against said pressure plate.

8. A quick set hydraulic workholding vise as defined in claim 6, wherein said piston members are located at three substantially equally circumferentially spaced positions located in a path outwardly surrounding said slide control bolt to bear forwardly against said pressure plate.

9. A quick set hydraulic workholding vise as defined in claim 1, wherein said slide plate includes an outwardly facing elongated channel groove in each side thereof extending substantially the length of the slide plate and said compound wedge means comprises a pair of movable wedge members having tongue formations interfitting into said channel grooves and having inclined cam surfaces facing away from the slide plate confronting and slidably movable along co-acting inclined cam surfaces of wedge blocks fixed to the movable jaw, and the movable jaw including wedge operating means for moving the wedge members relative to the wedge blocks to force the tongue formations of the wedge members tightly into said channel grooves and frictionally grip the slide plate to clamp the movable jaw at said coarse adjustment position.

10. A quick set hydraulic workholding vise as defined in claim 2, wherein said slide plate includes an outwardly facing elongated channel groove in each side thereof extending substantially the length of the slide plate and said compound wedge means comprises a pair of movable wedge members having tongue formations interfitting into said channel grooves and having inclined cam surfaces facing away from the slide plate confronting and slidably movable along co-acting inclined cam surfaces of wedge blocks fixed to the movable jaw, and the movable jaw including wedge operating means for moving the wedge members relative to the wedge blocks to force the tongue formations of the wedge members tightly into said channel grooves and frictionally grip the slide plate to clamp the movable jaw at said coarse adjustment position.

11. A quick set hydraulic workholding vise as defined in claim 3, wherein said slide plate includes an outwardly facing elongated channel groove in each side thereof extending substantially the length of the slide plate and said compound wedge means comprises a pair of movable wedge members having tongue formations interfitting into said channel grooves and having inclined cam surfaces facing away from the slide plate confronting and slidably movable along co-acting inclined cam surfaces of wedge blocks fixed to the movable jaw, and the movable jaw including wedge operating means for moving the wedge members relative to the wedge blocks to force the tongue formations of the wedge members tightly into said channel grooves and frictionally grip the slide plate to clamp the movable jaw at said coarse adjustment position.

12. A quick set hydraulic workholding vise as defined in claim 5, wherein said slide plate includes an outwardly facing elongated channel groove in each side thereof extending substantially the length of the slide plate and said compound wedge means comprises a pair of movable wedge members having tongue formations interfitting into said channel grooves and having inclined cam surfaces facing away from the slide plate confronting and slidably movable along co-acting inclined cam surfaces of wedge blocks fixed to the movable jaw, and the movable jaw including wedge operating means for moving the wedge members relative to the wedge blocks to force the tongue formations of the wedge members tightly into said channel grooves and frictionally grip the slide plate to clamp the movable jaw at said coarse adjustment position.

13. A quick set hydraulic workholding vise as defined in claim 7, wherein said slide plate includes an outwardly facing elongated channel groove in each side thereof extending substantially the length of the slide plate and said compound wedge means comprises a pair of movable wedge members having tongue formations interfitting into said channel grooves and having inclined cam surfaces facing away from the slide plate confronting and slidably movable along co-acting inclined cam surfaces of wedge blocks fixed to the movable jaw, and the movable jaw including wedge operating means for moving the wedge members relative to the wedge blocks to force the tongue formations of the wedge members tightly into said channel grooves and frictionally grip the slide plate to clamp the movable jaw at said coarse adjustment position.

14. A quick set hydraulic workholding vise as defined in claim 9, wherein said base plate member includes an upwardly projecting dovetail guide tongue centered width-wise thereon and extending from the rear end thereof over the major portion of the distance to said stationary jaw, and said slide plate having a downwardly opening dovetail groove extending the major portion of its length and closely corresponding to the cross-sectional configuration of said dovetail guide tongue receiving said dovetail guide tongue therein for guiding longitudinal movement of the slide member in parallelism with said longitudinal axis.

15. A quick set hydraulic workholding vise as defined in claim 9, wherein said wedge operating means includes a release bar transversely spanning the major portion of the width of the movable jaw and base plate member supported in the movable jaw for fore-and-aft translatory movement in directions paralleling said longitudinal axis and having opposite lateral end portions bearing against shoulder formations of said wedge members to control movement of said wedge members relative to their companion wedge blocks, and an eccentric control pin rotatably supported in said movable jaw for moving said release bar between first and second positions disposing said wedge members at release and gripping positions respectively relative to said slide plate.

16. A quick set hydraulic workholding vise as defined in claim 10, wherein said wedge operating means includes a release bar transversely spanning the major portion of the width of the movable jaw and base plate member supported in the movable jaw for fore-and-aft translatory movement in directions paralleling said longitudinal axis and having opposite lateral end portions bearing against shoulder formations of said wedge members to control movement of said wedge members relative to their companion wedge blocks, and an eccentric control pin rotatably supported in said movable jaw for moving said release bar between first and second positions disposing said wedge members at release and gripping positions respectively relative to said slide plate.

17. A quick set hydraulic workholding vise as defined in claim 11, wherein said wedge operating means includes a release bar transversely spanning the major portion of the width of the movable jaw and base plate member supported in the movable jaw for fore-and-aft translatory movement in directions paralleling said longitudinal axis and having opposite lateral end portions bearing against shoulder formations of said wedge members to control movement of said wedge members relative to their companion wedge blocks, and an eccentric control pin rotatably supported in said movable jaw for moving said release bar between first and second positions disposing said wedge members at release and gripping positions respectively relative to said slide plate.

18. A quick set hydraulic workholding vise as defined in claim 12, wherein said wedge operating means includes a release bar transversely spanning the major portion of the width of the movable jaw and base plate member supported in the movable jaw for fore-and-aft translatory movement in directions paralleling said longitudinal axis and having opposite lateral end portions bearing against shoulder formations of said wedge members to control movement of said wedge members relative to their companion wedge blocks, and an eccentric control pin rotatably supported in said movable jaw for moving said release bar between first and second positions disposing said wedge members at release and gripping positions respectively relative to said slide plate.

* * * * *